Aug. 7, 1962 O. SCHWENDT ETAL 3,047,922

SLIDE FASTENER

Filed April 8, 1959

INVENTORS:
Otto Schwendt
Julius Meimberg
by Emery, Booth, Townsend, Miller & Widner
ATTORNEYS

3,047,922
SLIDE FASTENER
Otto Schwendt, Wuppertal-Barmen, and Julius Meimberg, Munster, Westphalia, Germany, assignors to Ri-Ri Werke A.G., Mendrisio, Switzerland
Filed Apr. 8, 1959, Ser. No. 805,061
Claims priority, application Germany Apr. 12, 1958
3 Claims. (Cl. 24—205.1)

The present invention relates to a slide fastener in which a support associated to the fastener elements maintains the latter in the required spaced relationship.

It is well known to secure the fastener elements of slide fasteners in the required spaced relationship onto supporting cords and to subsequently secure these rope or strand-like units to the supporting fabric i.e. the stringer tapes, whereby it is preferable to connect with the fabric the fork ends of the base portions of the fastener elements, projecting beyond the supporting cord. In this prior construction it is also possible to secure the supporting cords to the stringer directly by weaving on. Moreover there are slide fasteners known the fastener elements of which are ridingly mounted on beaded rims of the stringers and which are provided on the front side of their heads with longitudinally extending recesses, which when the fastener is closed engage the zones of the beaded rim of the other stringer lying between adjacent elements so as to realize a transverse locking.

The present invention aims to provide a cheaply manufacturable slide fastener of small dimension, which may take over high loads and which does not lose any of its reliability even after a long use.

To this end the present invention provides a supporting cord extending longitudinally at each side of the fastener elements and which is annularly enclosed by the base portions of the fastener elements mounted thereon and which, when the fastener is closed, is lying with its zones extending between adjacent base portions of the fastener elements in longitudinal recesses provided in the front ends of the heads of the fastener elements on the opposite row of fastener elements so as to provide a transverse locking for the engagement of the fastener elements.

While such a slide fastener uses the well-known mounting of the fastener elements onto a supporting cord or supporting rope respectively, which renders possible the provision of very small longitudinal dimensions of the fastener elements, it permits the realization of a small thickness of the fastener elements as the base portions of the latter must not resist bending loads as is the case in the well-known fastener elements rigidly clamped onto their supports. Moreover the heads of the fastener elements must not have such intricate shapes as was required in prior constructions, in order to provide for a secure transverse locking as, in this respect, the invention makes use of the also known possibility to overengage the rim of the support with the longitudinally slotted front end of the head.

The fastener elements may be secured to the supporting cords associated to them in various manners. In one embodiment of the invention the fastener elements made of a synthetic material or of a metallic die-casting alloy are directly moulded on the supporting rope or cord. The manufacture in this manner is rapid and trouble-free as the fastener elements are of very simple shapes.

The invention thus provides a slide fastener which may be produced very cheaply, which is of small dimensions, which effectively resists high loads and which has a long duration of life.

The securing of the supporting cord bearing the fastener elements to the stringer tape may also be effected in various manners.

As already mentioned it is well-known to secure the supporting cords carrying the fastener elements to the fabric or stringer by weaving. This operation may successfully be effected with the cords of fastener elements according to the invention, whereby the longitudinal slots in the front faces of the heads of the fastener elements engage over the weft end portions securing the supporting cords.

According to a further feature of the invention the weaving-on of the supporting cords carrying the fastener elements may be such that the supporting cord is woven to a stringer thereby including at least one covering cord extending at the rear of or above respectively of the face portions of the fastener elements, whereby the supporting cord again serves to improve the appearance, to additionally support the fastener elements and eventually to guide a slider.

Likewise, the stringer, to which is woven the supporting cord provided with the fastener elements may be formed with one or two flaps extending in such manner over the fastener elements that the latter are invisible.

The lateral locking of the engagement of the fastener elements by the over-engagement of the supporting cords with the slotted front ends of the heads of the fastener elemetns as it is realized in the fastener according to the invention moreover permits small dimensioning of the fastener elements, and, in spite thereof, these serve directly as guide track for the slide. Thereby the mechanical loads or strains to which the strip or band portions of the fastener are subjected remain small and the danger of clamping and the like is effectively prevented.

Other features and advantages of the invention will become apparent from the description now to follow of preferred embodiments thereof, given by way of example only, and in which reference will be made to the accompanying drawings. In these drawings.

Figure 1:
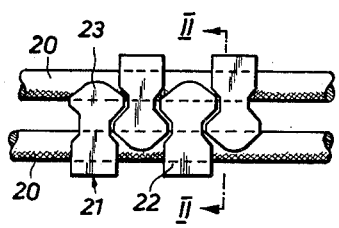
FIGURE 1 is a top view of a pair of supporting cords with their fastener elements interengaged.
Figure 2:
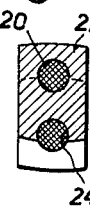
FIGURE 2 is a section taken along the line II—II of FIGURE 1.

The principle of the slide fastener according to the present invention may be best seen in FIGURES 1 and 2. A supporting cord 20 extends along each side of the fastener and the cords 20 carry the fastener elements 21 arranged in the required spaced relationship thereon and preferably directly moulded onto the cords. As shown in FIGURE 2 the base portions 22 of the fastener elements annularly surround or enclose the cord 20. This permits the base portions of the fastener elements to be made very small and in spite thereof to take up high loads. The heads 23 of the fastener elements are large and provided at their front faces with longitudinally extending grooves or slots 24. When the fastener is closed the grooves 24 receive the cords 20 of the opposite row of fastener elements, so that a rigid and secure transverse locking is obtained. Moreover the widened head portions 23 of the fastener elements engage each other in a well-known manner and form a lock taking up tensile strains. The base portions 22 of the fastener elements could be made substantially narrower than shown in the illustrated embodiment. As is visible from the drawing, the illustrated structure permits particularly small dimensioning as on the one hand the heads of the fastener elements are of a simple shape and as on the other hand the base portions of the fastener elements are very compact.

Figure 3:
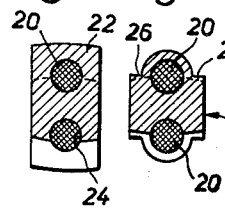
FIGURE 3 is a section similar to that of FIGURE 2, through a modified embodiment.

In the modification shown in FIGURE 3 the lateral faces of the fastener elements 25 are stepped in such manner, that guiding tracks 26 for a slider are produced in the zone of their base portions. Alternately instead of such guide tracks in the zone of the base portions the lateral faces of the fastener elements could be provided with slots serving as a guide track for corresponding guiding surfaces of a slider.

Figure 4:
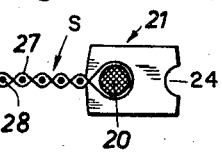
FIGURE 4 is a section showing one manner of fastening a supporting cord with the fastener elements to the stringer tape.

The cords 20 provided with the fastener elements 21 and 25, respectively, could be directly woven to the stringers as shown in FIGURE 4, whereby the weft ends 27 loop-in the cords 20 in the zones lying between subsequent fastener elements 21 and moreover bind the warp ends 28 of the stringers.

Figure 5:
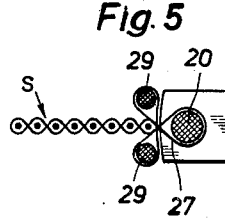
FIGURE 5 is a section similar to that of FIGURE 4, showing another manner of securing the supporting cord to the stringer.

According to FIGURE 5 the weft ends 27 secure not only the cord 20 provided with the elements 21, but in addition they secure cover cords 29 extending above and behind the base portions of the fastener elements. In some cases it will be sufficient to provide only one covering cord 29. It would, of course, also be possible to provide one side of the fastener with several covering cords 29 and warp ends respectively, which could also be fixed by the weft threads 27.

Figure 6:
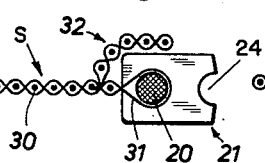
FIGURE 6 shows still a further embodiment.
Figure 7:
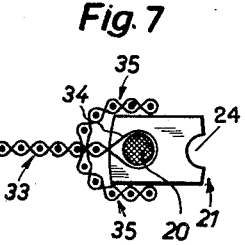
FIGURE 7 shows a still further embodiment.

In the embodiment according to FIGURE 6 a covering flap 32 is directly woven to the supporting bands comprising the warp ends 30 and to which is connected by weft ends 31 the supporting cord 20 provided with the fastener elements 21. The covering member of flap 32 preferably extends up to the middle portion of the fastener so that when the latter is closed, the fastener elements are not visible. Such an embodiment is shown in FIGURE 7 in which, however, two covering members 35 are directly formed at the supporting band 33 connected with the cord 20 by the weft ends 34.

The represented embodiments are of course to be taken as examples for the realization of the invention only. It is to be understood that the latter is not limited to such examples and that there are numerous other realizations possible. The outlines of the fastener elements may be varied and the fastener elements may be moulded from synthetic material or may be produced from die-casting alloys, whereby in all the cases the simple shape of the fastener element permits a high-rate production. The use of covering cords or the like or of covering flaps as may be provided permits to support the fastener elements and to prevent lateral escape thereof. The slider may run either on guide faces of the fastener elements, or on tracks formed by threads at the rear of the fastener elements.

Consequently, while we have shown and described what are now thought to be the preferred forms of the invention, it is to be understood that the same is susceptible of other forms and expressions. Consequently, we do not limit ourselves to the precise structures shown and described hereinabove, except as hereinafter claimed.

We claim:

1. A slide fastener comprising a pair of supporting cords, one of said cords extending along one side of the fastener and another cord extending along the opposite fastener side, fastener elements directly moulded in spaced relationship on said cords, said elements each having a base portion annularly enclosing the cord to which it is associated and a T-shaped head portion having its front face slotted in longitudinal direction with respect to the fastener, the said slots receiving, when the fastener is closed, portions of the opposite supporting cord between adjacent fastener elements on said cord so as to provide a lateral locking of the engagement of the fastener elements, said T-shaped head portions of said fastener elements having interengaging planar side surfaces which by themselves alone enable relative movement of said elements normal to the plane of the fastener and which potential relative movement is limited by said slotted front face lateral locking for said elements, and the supporting cord of each fastener side being woven to a stringer with the inclusion of at least a covering cord extending at the rear of and above said base portions of the fastener elements.

2. A slide fastener comprising a pair of supporting cords, one of said cords extending along one side of the fastener and another cord extending along the opposite fastener side, fastener elements directly moulded in spaced relationship on said cords, said elements each having a base portion annularly enclosing the cord to which it is associated and a T-shaped head portion having its front face slotted in longitudinal direction with respect to the fastener, the said slots receiving, when the fastener is closed, portions of the opposite supporting cord between adjacent fastener elements on said cord so as to provide a lateral locking of the engagement of the fastener elements, said T-shaped head portions of said fastener elements having interengaging planar side surfaces which by themselves alone enable relative movement of said elements normal to the plane of the fastener and which potential relative movement is limited by said slotted front face lateral locking for said elements, and the supporting cord of each fastener side being woven to a stringer with the inclusion of at least a covering flap.

3. A slide fastener comprising a pair of supporting cords, one of said cords extending along one side of the fastener and another cord extending along the opposite fastener side, fastener elements directly moulded in spaced relationship on said cords, said elements each having a base portion annularly enclosing the cord to which it is associated and a T-shaped head portion having its front face slotted in longitudinal direction with respect to the fastener, the said slots receiving, when the fastener is closed, portions of the opposite supporting cord between adjacent fastener elements on said cord so as to provide a lateral locking of the engagement of the fastener elements, said T-shaped head portions of said fastener elements having interengaging planar side surfaces which by themselves alone enable relative movement of said elements normal to the plane of the fastener and which potential relative movement is limited by said slotted front face lateral locking for said elements, and said slide fastener including cord-paralleling fabric stringers woven of warp and weft ends and wherein the supporting cords are directly woven to and along the adjacent margin of the corresponding stringer by 360° circumferential woven enclosure within weft ends of such stringer fabric itself as woven.

References Cited in the file of this patent

UNITED STATES PATENTS

| | | |
|---|---|---|
| 1,837,011 | Blair | Dec. 15, 1931 |
| 2,174,159 | Marinsky | Sept. 26, 1939 |
| 2,174,892 | Poux | Oct. 3, 1939 |
| 2,586,891 | Wahl | Feb. 26, 1952 |
| 2,654,930 | Rakowitzky | Oct. 13, 1953 |
| 2,867,879 | Urban | Jan. 13, 1959 |

FOREIGN PATENTS

| | | |
|---|---|---|
| 57,854 | Denmark | Aug. 5, 1940 |
| 442,809 | Great Britain | Feb. 17, 1936 |
| 221,913 | Switzerland | Sept. 16, 1942 |